Patented July 12, 1932

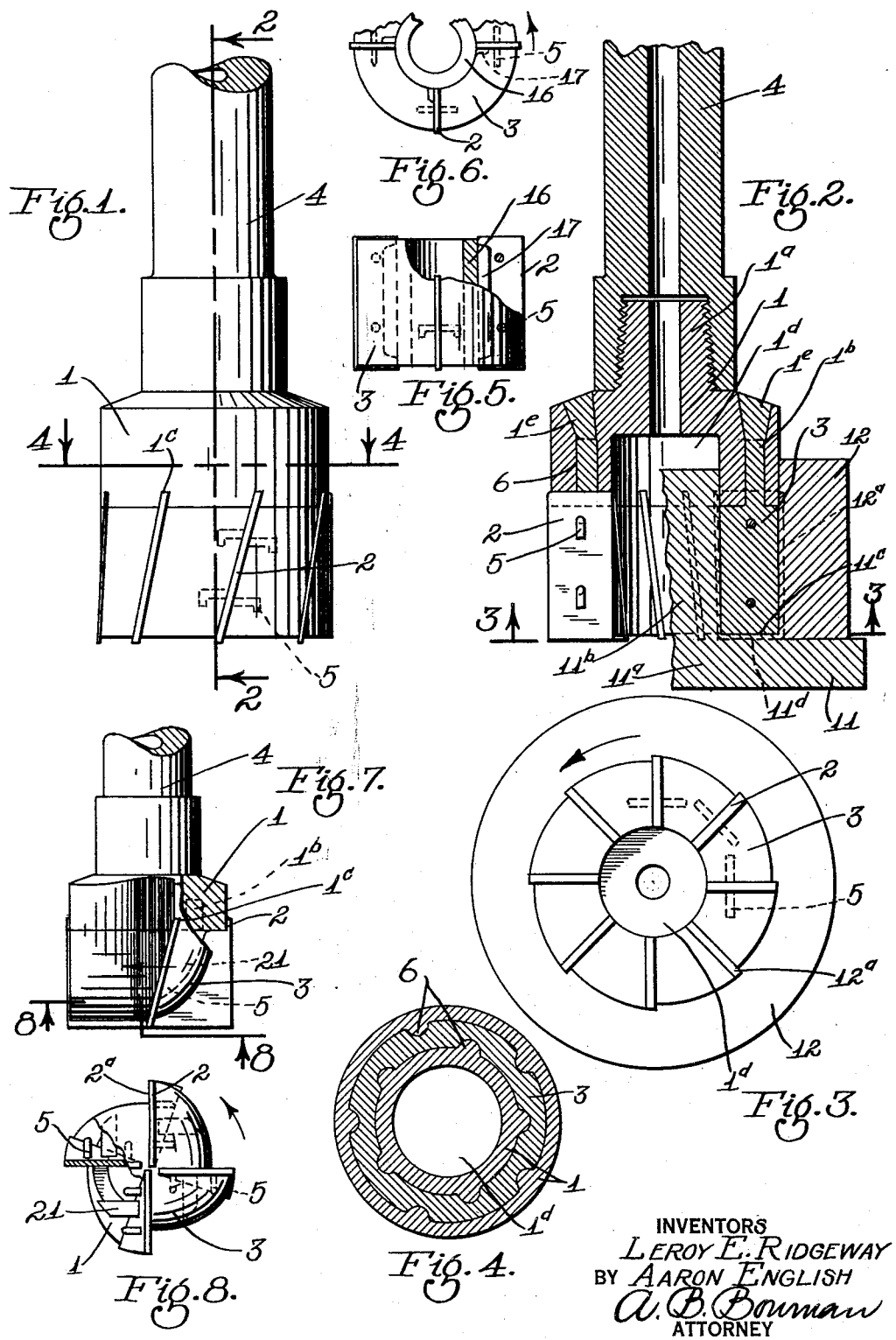

1,866,602

UNITED STATES PATENT OFFICE

LEROY E. RIDGEWAY AND AARON ENGLISH, OF LONG BEACH, CALIFORNIA, ASSIGNORS OF ONE-THIRD TO JAMES N. LOCKE, OF LONG BEACH, CALIFORNIA; SAID ENGLISH ASSIGNOR OF ONE-THIRD TO GLOBE OIL TOOLS CO., OF LOS NIETOS, CALIFORNIA, A CORPORATION OF CALIFORNIA

CUTTING MEANS AND METHOD OF MAKING THE SAME

Application filed May 7, 1930. Serial No. 450,549.

Our invention relates to cutters and to a method of preparing the same.

The objects of our invention are: first, to provide a cutting means, the cutting edges of which consist of hard cutting portions supported relative to each other, or relative to each other and to a supporting head or other member, by means of a relatively soft metal or other material which is adapted to wear away with and considerably faster than, the cutting edges, whereby a clearance or backing is at all times provided behind a cutting head; second, to provide a cutter of this class in which the cutting blades or members are secured in spaced apart relation and in their normal cutting relation, and relative to the supporting head or other supporting member, by means of a soft metal or other material poured between the cutting blades or members and against the supporting head or member, in a molten state, thus permitting the cutting members to be secured in any desired position relative to the supporting head or the like; third, to provide a cutter of this class in which the soft supporting metal or other material is anchored to the supporting head or the like and to the cutting blades so that the cutting blades or members form a rigid whole with the supporting head; fourth, to provide a cutter of this class in which only the cutting blades or small cutting members and the soft supporting metal between the same are worn away and in which the head remains substantially intact so that the same may be used over, the worn out blades being removed by merely heating the head to the melting point of the metal or other substance securing the blades to the head and positioning the same relative to each other; fifth, to provide a cutter of this class which is particularly well adapted for oil well drilling operations and generally for cutting hard materials and under conditions in which it is difficult to change the cutters; sixth, to provide as a whole a novelly constructed cutter of this class and one which is particularly simple and economical of construction and one which is durable and which will not readily deteriorate; and seventh, to provide a novel method of making cutters of this class.

With these and other objects in view, as will appear hereinafter, our invention consists of certain novel features of construction, combination and arrangement of parts and portions of our cutter, and of certain novel steps in making our cutter, as will be hereinafter described in detail and particularly set forth in the appended claims, reference being had to the accompanying drawing and to the characters of reference thereon, which form a part of this application, in which:

Figure 1 is a side view of our cutter in one form of construction, showing the same secured to a drill pipe or drill shank, the latter being shown fragmentarily; Fig. 2 is a longitudinal sectional view thereof taken through 2—2 of Fig. 1, showing portions thereof in elevation to facilitate the illustration, and showing a portion thereof located in and with respect to a mold for pouring the metal between the cutting blades or members and the cutter blade supporting head; Fig. 3 is an end view thereof showing the lower mold member removed; Fig. 4 is a transverse sectional view thereof taken through 4—4 of Fig. 1; Fig. 5 is a partial side view and partial sectional view of our cutter in a slightly modified construction having a different means for supporting the cutting blades and for cutting in a different manner; Fig. 6 is a fragmenary end view thereof; Fig. 7 is a partial side and partial sectional view of our cutter in still a different form of construction and adapted for drilling oil well holes; and, Fig. 8 is a partial end and partial sectional view taken at 8—8 of Fig. 7.

Like characters of reference refer to similar parts and portions throughout the views of the drawing.

The cutter shown in Figs. 1, 2, 3 and 4 is primarily adapted as an end mill for cutting portions of tools in oil wells preparatory to tool fishing operations. However, in slightly modified forms of construction, a similar, but longer, type of tool may be used for core work in oil well drilling.

The cutter shown in Figs. 1, 2, 3 and 4 consists primarily of a head 1, cutting members 2, and a relatively soft metal for supporting the cutting members relative to each other and to the head 1. The head 1, in this instance, is provided with a securing shank 1a for securing the same to a shank 4 of any suitable type. The head 1 is provided with a relatively deep annular groove 1b in the end thereof opposite the shank 1a. In the walls forming this groove are provided ridges 6 which form anchors for retaining the supporting metal 3, as shown in Fig. 4. The blades 2 are preferably relatively thin steel plates of good quality. These blades or plates are cut to the length desired and are positioned in radiating manner outwardly from the axis of the head, as shown in Fig. 3. These blades may also extend through the axis or they may be positioned at an angle, as shown in Fig. 1, so as to assume a slightly helical position. The normally inner ends of these plates or blades 2 may extend into notches 1c at the end of the head in which the annular groove is provided, as shown in Figs. 1 and 2. At the opposite sides of the cutting blades 2 are provided anchors 5 which are preferably in the form of hooks extending with their hook or enlarged portions away from the flat sides of the blades. These anchors may also be made of steel and welded or otherwise secured to the blades. The blades are secured, in the above described spaced apart cutting position, relative to each other and to the head by pouring the soft metal or other material 3 in molten form between and against the blades and against or into the head. We have found that bronze is an excellent material for this purpose since it melts at a relatively low temperature, is relatively soft as compared to steel, and has relatively high compression strength. In order to make the bronze adhere tightly to the blades and to the head, the portions thereof coming in contact with the bronze are copper plated or otherwise treated or plated, as desired.

In order to pour the supporting metal 3 in the above mentioned relation to the blades and the head, the blades and head are placed into a mold or a mold is placed around the blades and the desired portion of the head. The mold, in this instance, is made in two parts, namely, the base member 11 of the mold and an annular mold member 12. The base member consists of a plate 11a having a central upwardly extending core 11b which extends into a central opening 1d at the normally lower end of the head and around which the cutting blades 2 are positioned in radiating manner. Above the base plate 11a and around the core 11b, is an annular raised portion 11c in which are outwardly radiating grooves 11d which receive the normally lower ends of the blades 2 and space the supporting metal backwardly from the lower cutting edges of the blades. The mold member 12, in this instance, is placed around the head and the blades after the same are in position on the mold member 11. The member 12 is provided in its inner wall with grooves 12a for receiving the outer edges of the blades, thus making the latter edges of the blades extend some distance radially outwardly from the circumferential surface of the soft supporting metal 3. In this instance, the molten metal is shown poured in place through an opening or openings 1e extending upwardly through the wall of the head from the annular groove 1b, some of said holes 1e serving as vent holes.

In the modified structure shown in Figs. 5 and 6, the cutter head, or cutter supporting member, consists primarily of a cylindrical sleeve 16 which is provided with outwardly radiating ribs 17 which serve as anchors against which the inner edges of the cutting blades 2 may be positioned. The cutting blades are here also shown provided with anchors 5. The cutter illustrated in Figs. 5 and 6 is adapted to be used as a rock cutting tool and is adapted to be used as a rotary cutter rather than as an end mill.

In the modified structure shown in Figs. 7 and 8, which is primarily adapted for drilling oil wells, the cutting blades 2 are also positioned at the end of the head, as in the structure shown in Figs. 1, 2, 3 and 4, but the cutter shown in Figs. 7 and 8 is fluted to a large extent to permit materials to pass upwardly from the lower end of the cutter. Thus the front sides 2a of the cutting blades 2 are exposed at their outer edges, as shown in Fig. 8. Since the volume of the soft supporting metal in this modified structure is reduced, we have provided supporting tangs 21 which extend downwardly from the head 1 in the form of relatively narrow arms which are positioned immediately against the back sides of the cutting blades for reinforcing the same. The anchors 5, in this instance, are positioned at one side only of the cutting blades, namely, at the back sides thereof, but at the opposite sides of the tangs, as shown in Fig. 8. As the ends of the blades wear off, the ends of the tangs 21 also wear off, as well as the lower anchors 5. When replacing the blades with new cutting blades, the tangs 21 are again extended by welding portions to the outer ends.

In order to make the supporting metal 3 adhere to the blades, as well as to the heads or other supporting members, both are preferably plated at the sides or portions coming in contact with the metal 3. Prior to the pouring of the molten metal into and around the several members, the head member 1 is heated to approximately the melting point of the molten bronze or of the other substances employed for this purpose.

Though we have shown and described a particular construction, combination and arrangement of parts and portions of our cutter and certain modifications thereof, and a certain method of making the same, we do not wish to be limited to the particular construction, combination and arrangement, nor to the modification, nor to the particular method described, but desire to include in the scope of our invention the construction, combination and arrangement of parts and portions, and the method, substantially as set forth in the appended claims.

Having thus described our invention, what we claim as new and desire to secure by Letters Patent is:

1. In a cutter, a support having anchor means thereon, a plurality of relatively thin cutting blades positioned adjacent the support with a portion against said anchor means, and a relatively soft metal completely filling the space between the blades and against the support, and the anchor means thereon for rigidly holding the blades in cutting position on the support.

2. In a cutter, a support having anchor means thereon, a plurality of relatively thin cutting blades positioned adjacent the support with a portion against said anchor means, and a relatively soft metal completely filling the space between the blades and against the support and the anchor means thereon for rigidly holding the blades in cutting position on the support, said blades having also anchor means at their flat sides for securely anchoring the blades in the soft metal.

3. In a cutter of the class described, a head member having a shank at one end and anchor means at its opposite end, a plurality of thin cutting blades extending from the latter end of the head, and a soft metal connecting the blades to the latter end of the head and to the anchor means.

4. In a cutter of the class described, a head member having a shank at one end and anchor means at its opposite end, a plurality of thin cutting blades extending from the latter end of the head, and a soft metal connecting the blades to the latter end of the head and to the anchor means, said blades having also anchor means imbedded in said soft metal.

5. In a cutter of the class described, a head member having anchor means at one end, a plurality of cutter blades positioned with one end against the latter end of the head and positioned in circular spaced relation relative to each other, and a soft metal securing said blades in said spaced relation and to the anchor means of said head.

6. In a cutter of the class described, a head having a circular groove at one end and anchor means in said groove and cutter blade positioning means at said end, a plurality of thin cutter blades positioned with one end against said head and against the positioning means thereon, said blades being positioned in circular spaced relation, and a relatively soft metal completely filling the space between the blades and the groove for securing said blades to the head.

7. In a cutter of the class described, a head having a circular groove at one end and anchor means in said groove and cutter blade positioning means at said end, a plurality of thin cutter blades positioned with one end against said head and against the positioning means thereon, said blades being positioned in circular spaced relation, a relatively soft metal completely filling the space between the blades and the groove for securing said blades to the head, said blades having also anchor means at their flat sides imbedded into said soft metal.

8. In a cutter of the class described, a supporting member, a plurality of relatively thin cutter blades positioned with one edge thereagainst and extending outwardly therefrom, and a relatively soft material completely filling the space between the cutter blades and the supporting member for securing said blades in spaced relation relative to each other and on said supporting member.

9. The herein described method of making cutters consisting in plating cutting blades, then placing the same in their normal cutting relation into a mold and relative to a supporting head, and then pouring a molten metal into the mold against the blades and against the supporting head.

10. The herein described method of making cutters consisting in plating cutting blades, then placing the blades in their normal cutting relation in a mold and relative to a supporting head, and then pouring molten bronze into the mold against the blades and against the supporing head.

11. The herein described method of making cutters consisting in plating cutting blades and a cutter head, then heating the cutter head, then placing said blades in their normal cutting relation into a mold and in their cutting relation relative to the plated portion of the head, and then pouring molten metal into the mold between the blades and against the plated portion of the head, said head being heated substantially to the melting point of said molten metal.

12. The herein described method of making cutters consisting in plating cutting blades, then placing said blades into a mold in their normal cutting relation relative to a cutter head, then pouring molten metal into the mold between the blades and against the head, said head being heated substantially to the melting point of said molten metal.

13. The herein described method of making cutters consisting in plating cutting blades and a cutter head, then placing said blades into a mold in their normal cutting relation relative to the plated portion of the head, and then pouring molten metal into the mold against the blades and against the plated portion of the head.

14. The herein described method of making cutters consisting in plating cutting blades, then placing said blades into a mold in their normal cutting relation relative to a cutter head, then placing anchors against said blades, then pouring molten metal into the mold between the blades and around said anchor and against the head.

In testimony whereof, we have hereunto set our hands at Long Beach, California, this 30 day of April 1930.

LEROY E. RIDGEWAY.
AARON ENGLISH.